June 19, 1962 V. J. COATES ET AL 3,039,353
RADIATION COMPARISON SYSTEMS
Original Filed June 14, 1954 2 Sheets-Sheet 1
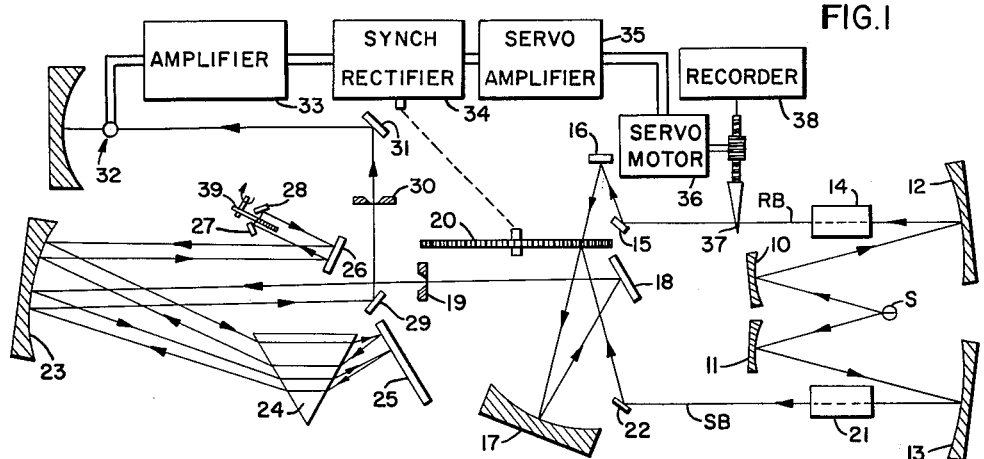
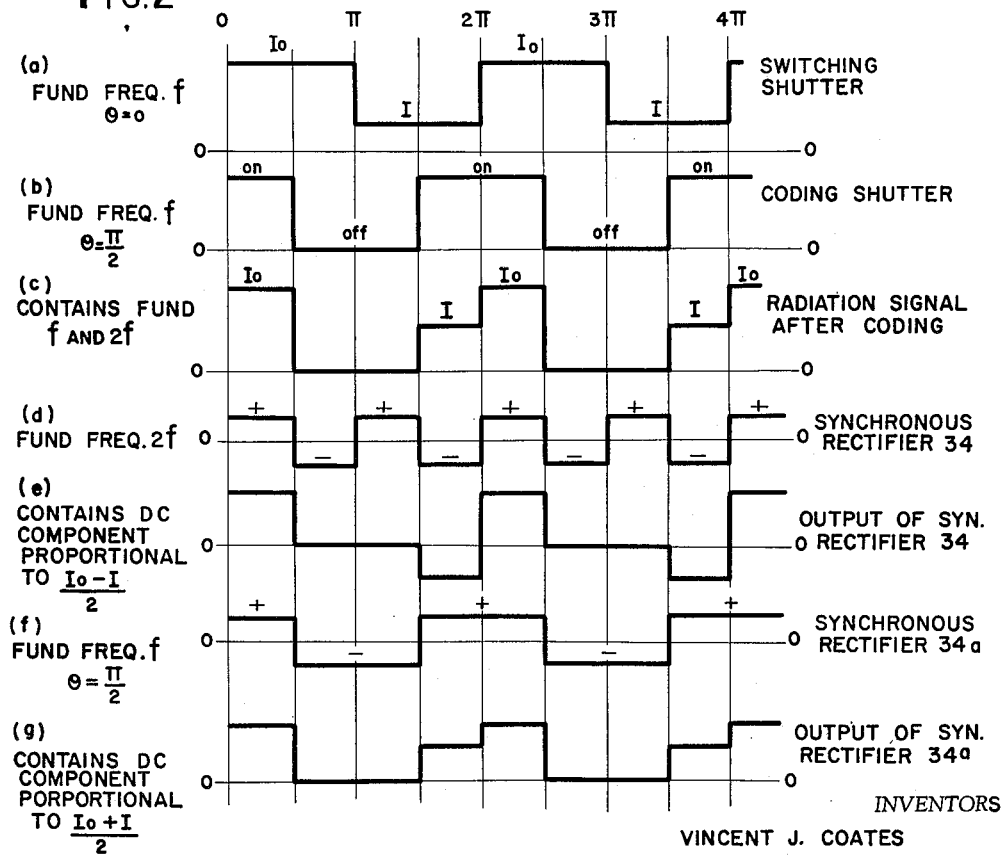
INVENTORS
VINCENT J. COATES
LARKIN B. SCOTT
BY
ATTORNEYS June 19, 1962  V. J. COATES ET AL  3,039,353
RADIATION COMPARISON SYSTEMS
Original Filed June 14, 1954  2 Sheets-Sheet 2
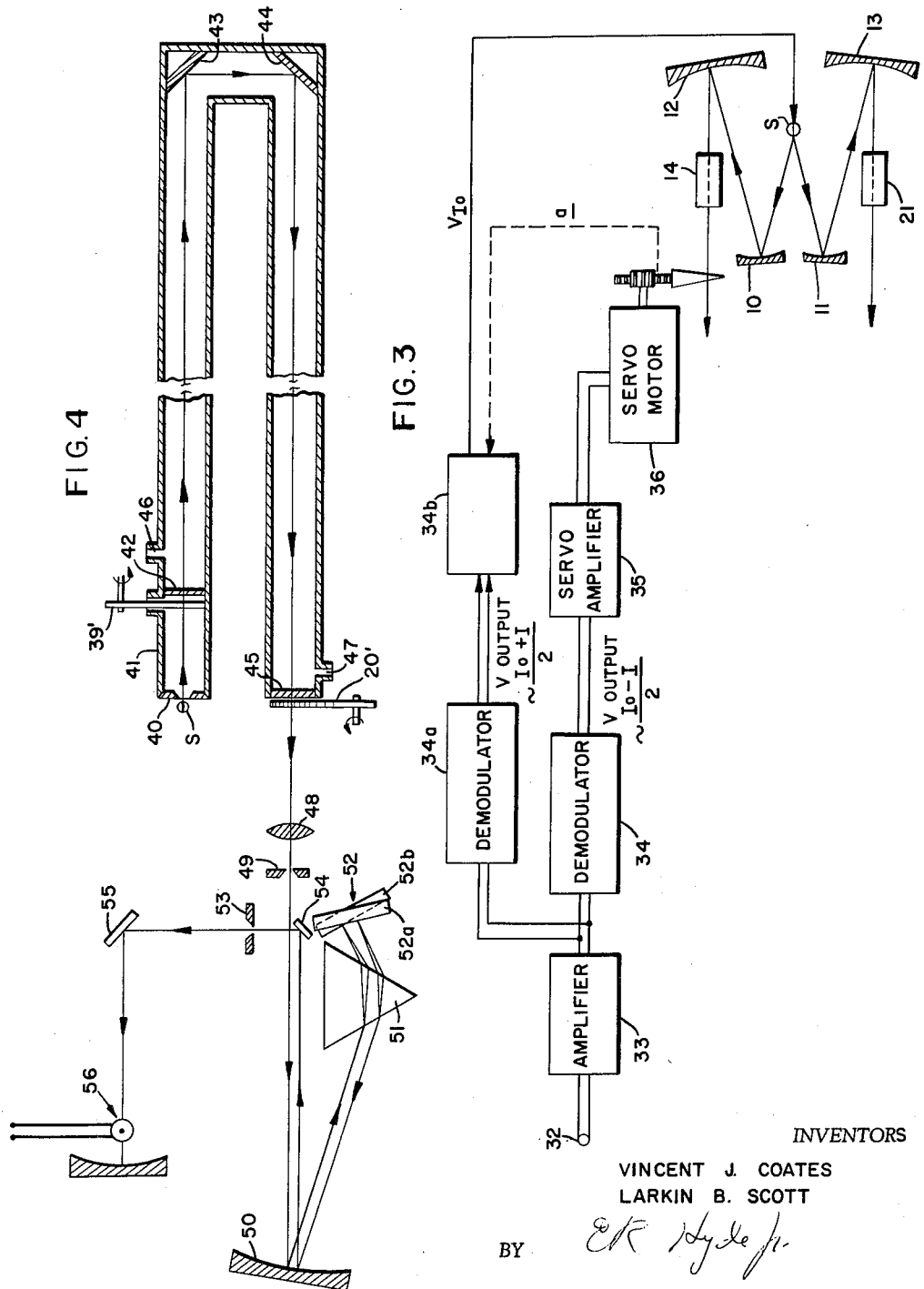
INVENTORS
VINCENT J. COATES
LARKIN B. SCOTT
BY
ATTORNEYS

United States Patent Office 3,039,353
Patented June 19, 1962

3,039,353
RADIATION COMPARISON SYSTEMS
Vincent J. Coates, Westport, Conn., and Larkin B. Scott, Fort Worth, Tex., assignors to The Perkin-Elmer Corporation, Norwalk, Conn., a corporation of New York
Original application June 14, 1954, Ser. No. 436,388, now Patent No. 2,900,866, dated Aug. 25, 1959. Divided and this application Nov. 25, 1957, Ser. No. 698,412
3 Claims. (Cl. 88—14)

This application is a division of application S.N. 436,388, filed June 14, 1954, now Patent Number 2,900,866 granted August 25, 1959.

This invention relates to radiation comparison systems of the type, in which at least one of a pair of beams from a source is modified to give it characteristics representative of an unknown substance and narrow wavelength bands taken from the respective beams are then caused to fall alternately upon a detector, so that the resultant signals produced by the detector can be compared to furnish information as to the unknown. More particularly, the invention is concerned with a novel comparison system, which includes means preventing undesirable or unwanted radiation falling upon the detector from introducing errors in the comparison of the two signals, such unwanted radiation being stray or false radiation from outside the system, radiation of inadequate spectral purity, etc. The new system provides the detector with radiation of high resolution and functions with greater accuracy and at a better signal-to-noise ratio than prior similar systems. While the new system may be employed in various applications, a form of the system for use in infrared absorption spectrometry is typical and will, accordingly, be illustrated and described for purposes of explanation.

Double beam infrared spectrophotometers commonly include a source of radiation, a dispersing system or monochromator, which spreads out into a spectrum radiation falling thereon and provides a selected narrow wavelength band of such radiation, a device acting to separate the radiation into two distinct beams, one representing the unknown or sample and the other the standard or reference, and a detector and amplification system, which measures the intensity of the radiation in the respective beams and produces a signal representing the ratio of the intensities, their sum, or the difference between them. The performance of such instruments is judged primarily by the narrowness of the wavelength band falling upon the detector and by the absence of stray or false radiation of undesirable wavelengths from this band. Various expedients have been employed to eliminate errors arising from the unwanted radiation referred to and a modified single beam monochromator, which has improved dispersive power and minimizes stray or false radiation, is disclosed in the patent to Walsh 2,652,742, issued September 22, 1953.

The Walsh monochromator comprises the usual features namely, an entrance slit, an element acting either to collimate or focus radiation falling upon it, a prism, a Littrow mirror, and an exit slit. Radiation, which has been dispersed in the Walsh device and would ordinarily pass out through the exit slit, is intercepted by an optical system and returned through the monochromator for a second dispersion. Two wavelength bands then appear at the exit slit, one being first pass radiation, which has undergone a single dispersion, and the second being second pass radiation, which has been intercepted by the optical system and returned for a second dispersion. In order that second pass radiation can be distinguished from first pass radiation, the Walsh device includes a chopper disposed at such a position in relation to the interception system, that the second pass radiation is chopped and falls upon the detector to produce an A.C. signal. The first pass radiation is not chopped and it causes the detector to produce a D.C. signal. A rectifier forming part of the detection and amplification system rectifies the A.C. signal, but the D.C. signal from the first pass radiation does not appear at the output from the rectifier. In this way, the instrument discriminates between first and second pass radiation.

The Walsh system provides a narrow wavelength band of radiation of great purity, but is not applicable to most double beam spectrophotometers, in which a switching element or shutter is employed to cause the beams to pass alternately. With such a shutter, the system is essentially of the A.C. type and, if the Walsh monochromator were utilized, the first pass radiation would be measured by the A.C. amplifier and thus impair the accuracy of the instrument. A further objectionable feature of the Walsh system is that the shutter or chopper employed to chop the second pass radiation is in itself a source of infrared radiation and produces an A.C. signal superimposed on the second pass radiation and thus introducing zero errors.

The present invention is directed to the provision of a novel radiation comparison system, which makes possible the accurate and rapid comparison of two or more beams of radiation in the presence of unwanted spurious radiation. In the new system, signals produced by such unwanted radiation are not measured with those produced by the wanted radiation and, as a result, the unwanted radiation does not reduce the accuracy of the system.

For a better understanding of the invention, reference may be made to the accompanying drawings, in which FIG. 1 is a diagrammatic view of a double beam, double pass spectrophotometer embodying the system of the invention;

FIG. 2 is a set of graphs explanatory of the operation of the components of the new system;

FIG. 3 is a diagrammatic view of part of the instrument of FIG. 1 with two synchronous rectifiers in use; and FIG. 4 is a diagrammatic view of a modified form of the system of the invention.

The spectrophotometer illustrated in FIG. 1 comprises a source of radiation S, from which radiation travels to spherical mirrors 10 and 11 to be reflected thereby upon respective spherical mirrors 12 and 13. The mirror 12 produces a reference beam RB, which passes through a cell 14 containing a standard or reference substance and is then directed by plane mirrors 15, 16 to a spherical mirror 17. From mirror 17, the beam travels to plane mirror 18 and is directed thereby upon an entrance slit 19. A chopping disc 20 lies in the path of the radiation between mirrors 16 and 17 and the disc is of the semi-circular type and is so disposed that, during one-half of each revolution, it cuts off the radiation between the two mirrors and, in the other half of the revolution, it passes the radiation.

The mirror 13 forms the radiation falling thereon into a sample beam SB, which passes through a cell 21 containing a sample of the unknown substance and is then directed by a plane mirror 22 toward the chopping disc 20. The face of the disc opposed to the sample beam is reflecting and, during the half of its revolution when disc 20 is passing radiation from mirror 16 to mirror 17, the radiation from mirror 22 is continuing along its course past the disc. When disc 20 is cutting off the radiation from mirror 16 to mirror 17, the radiation from mirror 22 falls upon the face of the disc and is reflected thereby to mirror 17, whence it travels to mirror 18 and is directed upon the entrance slit 19. With this arrangement, the disc 20, which may be referred to as a switching shutter, interrupts the radiation traveling from the source to the detector, so that the reference and sample beams fall in alternation upon the entrance slit.

Radiation passing through the entrance slit 19 falls upon a paraboloidal mirror 23, which collimates the radiation and directs it to the dispersing element 24, such as a prism or a grating. The dispersed radiation issuing from the illustrated prism falls upon a Littrow mirror 25 and is returned thereby to the dispersing element for a second dispersion. The dispersed radiation leaving the dispersing element returns to the mirror 23 and is directed thereby upon a plane mirror 26, whence the radiation travels to a diagonal mirror 27. From mirror 27, the radiation passes to a second diagonal mirror 28 and returns by way of mirrors 26 and 23 to the dispersing element. Radiation issuing from the dispersing element passes again to the Littrow mirror, then back through the prism to mirror 23, by which it is focused, so that, after being turned by plane mirror 29, it falls upon the exit slit 30. The beam issuing from the exit slit is turned by plane mirror 31 and travels to a detector indicated at 32.

The output of the detector may be utilized in various ways and, in the system shown, the detector output passes to an amplifier 33 and the amplified signal is then fed to a synchronous rectifier 34 operated in synchronism with the switching shutter 20 but at twice the frequency thereof. The rectified signal goes to a servo-amplifier 35, the output of which is supplied to a servomotor 36. The servomotor operates an attenuator 37 in the reference beam by moving the attenuator in and out of the beam to vary the intensity of the beam and thus bring the reference and sample beams into balance. The attenuator is connected to the moving element of a recorder 38 and the record made by the recorder represents the movement of the attenuator required to bring the system to a null condition with the beams in balance. Such attenuator movement is a function of the difference between the intensities of the reference and sample beams.

It will be observed that, in the monochromator of the instrument, mirrors 27, 28 cause radiation falling thereon to return for a second passage back and forth through the prism and the radiation passing from mirror 27 to mirror 28 thus ultimately issues from the exit slit as second pass radiation. At the same time, first pass radiation, that is, radiation which has traveled only once back and forth through the prism, issues through the exit slit, and the first pass and second pass radiation are of different wavelengths. The second pass radiation is of approximately twice the dispersion of the first pass radiation and thus has an increased resolution for the same signal-to-noise ratio. The second pass radiation is that desired, while the first pass radiation is unwanted. In order to discriminate between the two radiations, a rotary chopping disc 39 is so disposed as to periodically interrupt the radiation passing from mirror 27 to mirror 28. The disc 39 may be referred to as a coding shutter and it is operated at the same frequency as the switching shutter, but with a phase difference of 90°.

The graphs of FIG. 2 illustrate the mode of operation of the new system and, in the graphs, the beams are shown, for purposes of clarity, in a condition of unbalance. It is to be understood, however, that, in the instrument of the null type described, the beams are maintained by the attenuator at a condition of equal intensity.

The graph 2(a) represents the intensity of the radiation just beyond the switching shutter, that is, the first pass radiation. The zero line on the graph indicates absence of radiation and, by their height above the zero line, the parts of the graph marked $I_0$ indicate the intensity of the radiation in the reference beam, and the parts marked $I$ indicate the intensity of the radiation in the sample beam. Under the conditions assumed, there is less absorption of radiation by the standard than by the sample, so that the intensity of the reference beam is substantially greater than that of the sample beam.

The graph 2(b) illustrates the mode of operation of the coding shutter 39, which alternately passes and interrupts the beam traveling from mirror 27 to mirror 28. The coding shutter operates at the same fundamental frequency $f$ as the switching shutter, but with a phase difference $\theta$ of $$\frac{\pi}{2}$$

or 90°.

The effect on the radiation of the combined actions of the two shutters is illustrated in the graph 2(c), which indicates the variations in intensity of the wanted second pass radiation falling upon the detector. The radiation contains components of fundamental frequencies $f$ and $2f$ and the detector output contains similar components. When the detector output is supplied to a full wave synchronous rectifier, such as rectifier 34, which is operated at a frequency $2f$ and in phase with the switching shutter as shown in graph 2(d), the rectifier output is the signal shown in graph 2(e), which has a D.C. component proportional to the difference between $I$ and $I_0$.

With the rectifier operating as described, the first pass radiation produces a detector output, which enters the rectifier but does not result in any D.C. component in the signal from the rectifier, so that only second pass radiation is measured. Also, since the rectifier operates at a frequency $2f$, radiation from the coding shutter operating at a frequency $f$ and radiating at that frequency is ignored by the rectifier and thus does not create a measurement error.

In the system shown in FIG. 3, the detector output after amplification is fed both to the synchronous rectifier 34 and to a similar synchronous rectifier 34a which operates at a frequency $f$ and is in phase with the coding shutter and 90° out of phase with the switching shutter, as shown in the graph 2(f). The output of the second rectifying means 34a is a signal shown in graph 2(g) and having a D.C. component proportional to the sum of $I$ and $I_0$. First pass radiation is not rectified by this second rectifier, because the first pass radiation is 90° out of phase with the rectifier. The new signal may be employed for various purposes.

In a null type of instrument, it is assumed that $$a = \frac{I}{I_0} \quad (1)$$

where $I$ = sample beam intensity
$I_0$ = reference beam intensity
$a$ = the physical position of reference beam attenuator with respect to some base point.

The output of the synchronous rectifier 34a is a signal proportional to $aI_0 + 1$ and, if, in Equation 1, $aI_0 = I$, then $$aI_0 + I = 2I \quad (2)$$

With the value of $I$ thus determined from the output of the second synchronous rectifier 34a and the value of $a$ measured from the attenuator position, the value of $I_0$ can be computed by substituting the values for $I$ and $a$ in Formula 2. This value at 34b, FIG. 3, when converted to a voltage $V_{I_0}$ can then be used to enhance the signal level or to control the energy in the reference beam to maintain that energy at a constant level by regulating slit width by a mechanism shown for example in the article entitled "A Ratio-Recording Double Beam Infrared Spectrophotometer Using Phase Discrimination and a Single Detector" by A. Savitzky and R. S. Halford, pages 203 through 212, Review of Scientific Instruments, March 1950. Alternatively the control signal could vary the gain of amplifier 33 in any well known manner or it could vary the source temperature or other means.

Hence, by using the two synchronous rectifying systems in combination as described, a double beam, double pass spectrophotometer with automatic regulation of servo-loop gain may be provided, for example.

In some electro-optical systems, in which a switching shutter is employed, it is important to provide good imagery of the shutter throughout the optical system and also to measure radiation from the source only, while other radiation is ignored. The desired result can be achieved by the use of the invention and an example of its use for the specified purpose is illustrated by the system shown in FIG. 4.

The FIG. 4 system is an infrared analyzer having a a path betwen the source and the monochromator, which may be of substantial length. If the switching shutter in such a system were placed close to the source, it would be difficult to obtain good optical imagery of the shutter after the beam had traversed so long a path. At the same time, if the shutter were placed just before the entrance slit of the monochromator, undesirable radiation might be passed by the shutter and enter the entrance slit. The difficulties are overcome in the system shown in the following manner.

The system includes a source S, which is placed close to a slit 40, and a coding shutter 39′, which is similar to shutter 39 and lies close to the slit, so that there is little chance that any radiation, except that from the source, will reach the shutter. The slit 40 may be mounted at the end of one leg of a tubular cell 41 of U-shape which has an opening in its wall, through which shutter 39′ extends. Beyond the shutter, the cell is closed by a window 42 transparent to infrared radiation and the beam traveling outward past the shutter falls successively upon diagonal mirrors 43, 44, and returns through the other leg of the cell to escape through a window 45. The cell has an inlet 46 and an outlet 47 for the gaseous sample. In some applications of the instrument as, for example, to determine the amount of a component present in the atmosphere, the cell 41 with its windows 42, 45 may be dispensed with and the source, slit 40, and mirrors 43, 44 may be placed in the open.

The radiation issuing through window 45 is interrupted by a switching shutter 20′ and the radiation is then focussed by an optical element 48 upon the entrance slit 49 of a monochromator. The radiation entering the slit travels to a collimating and focussing element 50 and the collimated radiation passes to a dispersing element 51 illustrated as a prism. The dispersed radiation issuing from the prism falls upon a Littrow mirror 52 formed of two parts 52a, 52b, which are mounted for relative angular adjustment about an axis normal to the plane of dispersion of the prism. The dispersed radiation falling upon the Littrow mirror is returned thereby to the prism for a second dispersion and is then focussed by mirror 50 upon an exit slit 53, the beam being turned on its way from the mirror to the slit by a diagonal mirror 54. The radiation issuing through the slit 53 is turned by a mirror 55 and falls upon a detector, generally indicated at 56.

In the system of FIG. 4, the shutters 20′ and 39′ operate at the same frequency but 90° out of phase. The detector output is then amplified and supplied to a synchronous rectifier similar to rectifier 34 and operating at a frequency 2f and in the same manner as either of the rectifiers described in connection with the instrument of FIG. 1, to produce signals in no way derived from unwanted radiation.

The analyzer illustrated in FIG. 4 is of the type shown in the patent to Atwood 2,679,185, issued May 25, 1954, and one of the two parts 52a, 52b of the Littrow mirror serves as a deviating means, so that part of the dispersed radiation falling upon the mirror may be considered to be directed thereby along its normal path to the exit slit 53, while the remainder is deviated. The deviated radiation differs in wavelength from the undeviated radiation and, in order that the switching shutter 20′ may cause the radiation of the two wavelengths to fall alternately upon the detector, the switching shutter must be placed at a definite location with reference to the deviating means 52a, 52b. This location of the switching shutter may be termed its "effective position" and that position is either close to the deviating means or at the location along the optical path of an image of the deviating means.

In both forms of the new system described, the radiation emanating from the coding shutter itself does not introduce zero errors, since the coding shutter operates at a frequency different from the frequency of synchronous rectifier 34. When a single synchronous rectifier is employed in either system, the phase relationships between the components are not highly critical, since inexact phase relationships do not introduce error but merely reduce the signal value.

We claim:

1. A spectrophotometer having reference and sample beams of radiant energy arranged to alternately pass through a monochromator, means modulating said beams at a first frequency for producing a first signal as a function of the difference between the alternate intensity of the radiant energy beams emerging from said monochromator, servomechanism loop means including an attenuator selectively responsive to said first signal for attenuating said reference beam to maintain said beams in a state of null, means modulating said beams to provide a second frequency for producing a second signal as a function of the intensity of said sample beam, means coupled to said servo mechanism loop means to multiply said second signal in proportion to the degree of attenuation of said reference beam necessary to maintain said state of null, and means operatively connecting said second signal to said servo mechanism loop means to control the gain of said servomechanism loop for maintaining said multiplied signal at a constant value.

2. A spectrophotometer having reference and sample beams of radiant energy arranged to pass through a monochromator alternately at the frequency $f$, means for modulating said beams to provide a component frequency $2f$, radiation-sensitive means positioned to receive the radiant energy emerging from said monochromator, said means being adapted to produce an output signal commensurate with the instantaneous intensity of the radiant energy impinging thereon, means selectively responsive to said $f$ frequency for producing a first signal as a function of the difference in intensity of said beams, servomechanism loop means including attenuator means connected to be actuated by said first signal for attenuating said reference beam to maintain said beams in a state of null, means selectively responsive to said $2f$ frequency for producing a second signal as a function of the intensity of said sample beam, means interconnected with said attenuator means to multiply said second signal in proportion to the degree of attenuation of said reference beam, and means operatively connecting said second signal to said servo mechanism loop means to control the gain of said servomechanism loop for maintaining said multiplied signal at a constant value.

3. A spectrophotometer having reference and sample beams of radiant energy arranged to alternately pass through a monochromator, means modulating said beams at a first frequency for producing a first signal as a function of the difference between the alternate intensity of the radiant energy beams emerging from said monochromator, servomechanism loop means including attenuator means selectively responsive to said first signal for attenuating said reference beam to maintain said beams in a state of null, means modulating said beams to provide a second frequency for producing a second signal as a function of the intensity of said sample beam, means coupled to said servo mechanism loop means to modify said second signal in proportion to the degree of attenuation of said reference beam necessary to maintain said state of null, and means operably connecting said second signal to said servo mechanism loop means to control the gain of said servomechanism loop for maintaining said modified signal at a constant value.

References Cited in the file of this patent

UNITED STATES PATENTS

| | | |
|---|---|---|
| 2,631,489 | Golay | Mar. 17, 1953 |
| 2,680,989 | Stavitzky et al. | June 15, 1954 |
| 2,750,834 | Golay | June 19, 1956 |
| 2,900,866 | Coates et al. | Aug. 25, 1959 |